(12) United States Patent
Edwards et al.

(10) Patent No.: US 11,880,852 B2
(45) Date of Patent: *Jan. 23, 2024

(54) MERCHANT ADVERTISEMENT INFORMED ITEM LEVEL

(71) Applicant: Capital One Services, LLC, McLean, VA (US)

(72) Inventors: Joshua Edwards, Philadelphia, PA (US); Adam Vukich, Springfield, VA (US); George Bergeron, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,901

(22) Filed: Sep. 27, 2022

(65) Prior Publication Data
US 2023/0018545 A1  Jan. 19, 2023

Related U.S. Application Data

(63) Continuation of application No. 16/929,706, filed on Jul. 15, 2020, now Pat. No. 11,494,791, which is a continuation of application No. 16/657,361, filed on Oct. 18, 2019, now Pat. No. 10,755,290.

(51) Int. Cl.
| | |
|---|---|
| *G06Q 30/00* | (2023.01) |
| *G06Q 30/0204* | (2023.01) |
| *G06Q 30/0201* | (2023.01) |
| *G06F 16/23* | (2019.01) |
| *G06Q 40/12* | (2023.01) |
| *G06F 40/205* | (2020.01) |
| *G06V 10/70* | (2022.01) |
| *G06V 30/146* | (2022.01) |
| *G06V 30/10* | (2022.01) |

(52) U.S. Cl.
CPC ......... *G06Q 30/0205* (2013.01); *G06F 16/23* (2019.01); *G06F 40/205* (2020.01); *G06Q 30/0201* (2013.01); *G06Q 30/0206* (2013.01); *G06Q 40/123* (2013.12); *G06V 10/768* (2022.01); *G06V 30/10* (2022.01); *G06V 30/147* (2022.01)

(58) Field of Classification Search
None
See application file for complete search history.

(56) References Cited

U.S. PATENT DOCUMENTS

| | | |
|---|---|---|
| 10,163,106 B2 | 12/2018 | Celikyilmaz et al. |
| 10,332,419 B2 * | 6/2019 | Prakash ............... G06Q 20/22 |
| 2012/0296731 A1 | 11/2012 | Ross |

(Continued)

*Primary Examiner* — Michael W Schmucker
(74) *Attorney, Agent, or Firm* — Banner & Witcoff, Ltd.

(57) ABSTRACT

Systems as described herein may include predicting item level data based on merchant advertisement information. A transaction pattern may be detected. The merchant advertisement information may be retrieved and parsed to generate a price list. A number of transactions that each shares a common payment amount may be determined and the number may reach a threshold value. Items from the price list may be matched with the common payment amount. The transaction records may be updated to indicate likely item level transaction information. In a variety of embodiments, the likely transaction information may be presented to a user.

20 Claims, 6 Drawing Sheets

(56) References Cited

U.S. PATENT DOCUMENTS

| | | |
|---|---|---|
| 2013/0346200 A1 | 12/2013 | Bandara et al. |
| 2014/0172599 A1 | 6/2014 | Argue et al. |
| 2015/0032615 A1 | 1/2015 | Blackhurst et al. |
| 2015/0046243 A1 | 2/2015 | Ricci |
| 2015/0332414 A1* | 11/2015 | Unser .................. G06F 16/285 705/30 |
| 2018/0082321 A1 | 3/2018 | Boccardi et al. |
| 2018/0139112 A1 | 5/2018 | Davis et al. |

* cited by examiner

MERCHANT ADVERTISEMENT INFORMED ITEM LEVEL

CROSS-REFERENCE

This application claims priority to U.S. non-provisional patent application Ser. No. 16/929,706 filed on Jul. 15, 2020, entitled MERCHANT ADVERTISEMENT INFORMED ITEM LEVAL DATA PREDICTIONS, which claims priority to U.S. non-provisional patent application Ser. No. 16/657,361, filed on Oct. 18, 2019, entitled MERCHANT ADVERTISEMENT INFORMED ITEM LEVAL DATA PREDICTIONS, and issued as U.S. Pat. No. 10,755,290 on Aug. 25, 2020, which application is hereby incorporated herein in its entirety.

FIELD OF USE

Aspects of the disclosure relate generally to big data and more specifically to the processing and management of transaction data.

BACKGROUND

In an electronic payment processing network, a financial institution may receive authentication requests from a merchant for transactions originated from numerous consumers. The financial institution may have access to transaction level information such as account numbers, transaction amounts, billing addresses and the transaction time and date. The financial institution may not have access to information that specifies the details of the individual items in the transactions. As such, conventional financial institutions may lack access to the item level information of the transactions, thereby limiting its ability to provide customers with insights into the purchase history and more meaningful search abilities.

Aspects described herein may address these and other problems, and generally improve the quality, efficiency, and speed of processing transaction data to offer insights into the details of the transaction by predicting item level data based on merchant advertisement information.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include predicting item level transaction information based on the merchant advertisement. A system may retrieve advertisement information associated with a merchant in a geographic area within a certain period of time. The advertisement information may be parsed to generate a price list for certain advertised products. A pattern of transactions associated with the merchant may be detected, where a group of transactions may each share a common payment amount. The system may determine that a number of transactions that share the common payment amount satisfies a threshold value. Based on the price list, the system may match items from the advertised products with the common payment amount. Transaction records of the user accounts may be updated to indicate likely item level transaction information for the matched items. In a variety of embodiments, an indication of a first transaction may be presented to a user with the likely item level transaction information. Accordingly, the system may be able to support more personalized searches and display more personalized advertisements.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
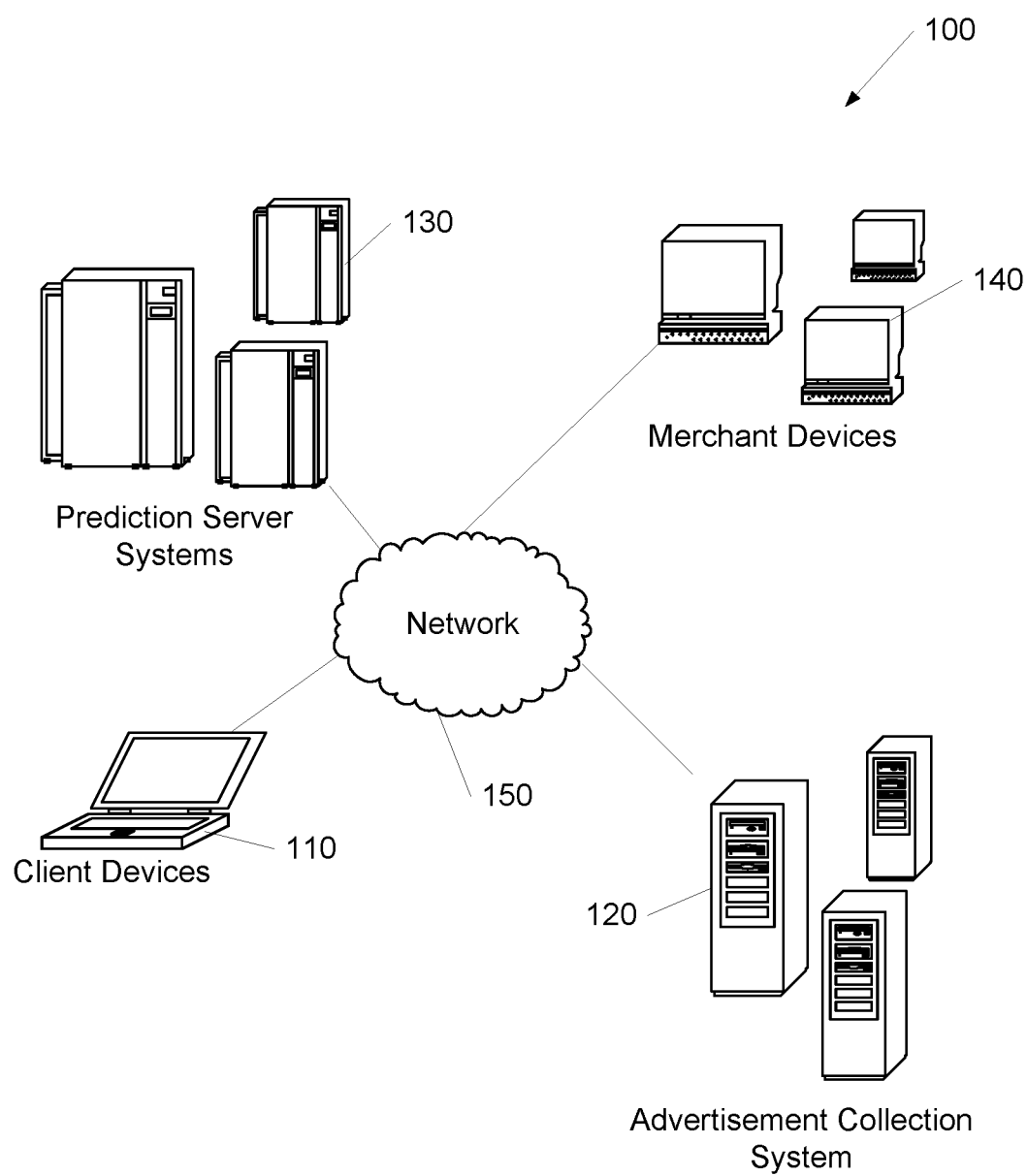
FIG. 1 shows an example of a system for predicting item level transaction information based on the merchant advertisement in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for predicting item level transaction information based on merchant advertisement. Many users may conduct transactions with the same merchant in a same geographic area. Many of these transactions may share a common payment amount, indicating that the users may have purchased similar items that have been advertised by the merchant. Payment amounts may be adjusted to back out local taxes, serving as further confirmation that the common payment amount may correspond to certain items promoted by the merchant advertisement. The item level prediction system may determine the likely items in the transactions that share the common payment amount and tag these transactions with item level data.

Item level data prediction systems as described herein allow for inferring item level data based on a common payment amount. An item level data prediction system may use web scraping to gather advertisement information from a merchant in a geographic location. The advertisement information may be parsed using natural language processing (NLP), image recognition, a template or Optical Character Recognition (OCR) to generate a price list indicating advertised items and the corresponding prices. The item level data prediction system may determine a pre-tax amount for items on the price list. The item level data prediction system may determine a tax rate for the items based on the geographic area of the merchant. The items from the price list may be matched with the common payment amount based on the pre-tax amount and the tax rate.

In many aspects, the items from the price list may be matched with the common payment amount using a least number of items algorithm or the most expensive items algorithm. Different combinations of items that match the common payment amount may be determined. A meta tag may be generated for each combination of items. A plurality of options corresponding to the different combination of items are generated and presented to a user to indicate the likely item level transaction information. A selection based on the meta tag may be received from the user. Accordingly, item level transaction information may be generated based on the selection.

Item level data prediction systems improve the functioning of computer systems to make predictions of item level data based on transaction level information to securely share data between the merchant and the financial institution. Item level transaction data is regularly omitted from information sent to the financial institution during payment processing. Aspects described herein may allow a financial institution to make inferences from the transaction level information and offer insights into the transaction details to the customers. The prediction systems may utilize publicly accessible information such as merchant advertisement information and tax rate corresponding to the geographic area to facilitate the matching process and increase the accuracy and efficiency of the predictions. The accuracy may be further improved by providing likely item level transaction information as options to the user and receiving user feedback on the options. The prediction systems provide a better representation of the customers' own spending, and may allow the customers to conduct more meaningful searches into their purchase history.

Item Level Data Prediction Systems

FIG. 1 shows an item level data prediction system 100. The item level data prediction system 100 may include at least one client device 110, at least one advertisement collection system 120, at least one prediction server system 130, and/or at least one merchant device 140 in communication via a network 150. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may request data prediction sessions, validate data prediction session requests, and/or obtain item level data as described herein. Advertisement collection system 120 may collect, parse, and/or store merchant advertisement information as described herein. An advertisement collection system may access public information related to merchant advertisement and generate a price list of advertised products and the corresponding prices. Prediction server systems 130 may receive an authentication request from merchant device 140 to authenticate a transaction. The transaction request may include transaction level information such as an account number associated with a user from which the transaction is originated, a billing address of the user, a payment amount and a transaction date/time. Prediction server systems 130 may further receive the price list from advertisement collection system 120. Advertisement collection system 120 may be a system independent from prediction server systems 130. Advertisement collection system 120 may also be a component residing on prediction server systems 130 (not shown).

In an event that there are many transactions such that each transaction may share a common payment amount, prediction server systems 130 may match items from the price list with the common payment amount. Prediction server systems 130 may generate likely item level data for these transactions that share the common payment amount and transmit the item level data to client devices 110.

The prediction server systems and/or merchant devices may be associated with a particular authentication session. Prediction server systems 130 may store a variety of transaction level data, generate the price list, predict item level data, and/or share item level data with client devices as described herein. However, it should be noted that any device in the item level data prediction system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in item level data prediction system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the item level data prediction system 100 in front of one or more computing devices such that any external devices may communicate directly with the specialized hardware.

Computing Devices

Figure 2:
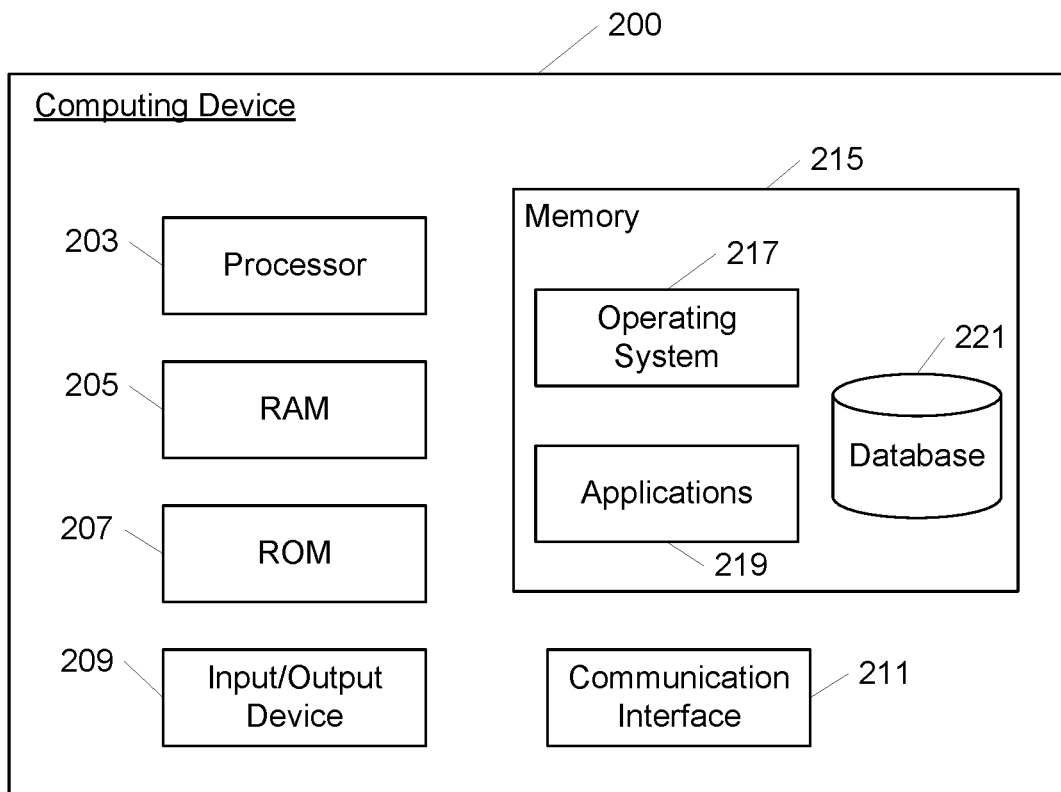
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Predicting Item Level Data Using Merchant Advertisement

Figure 3:
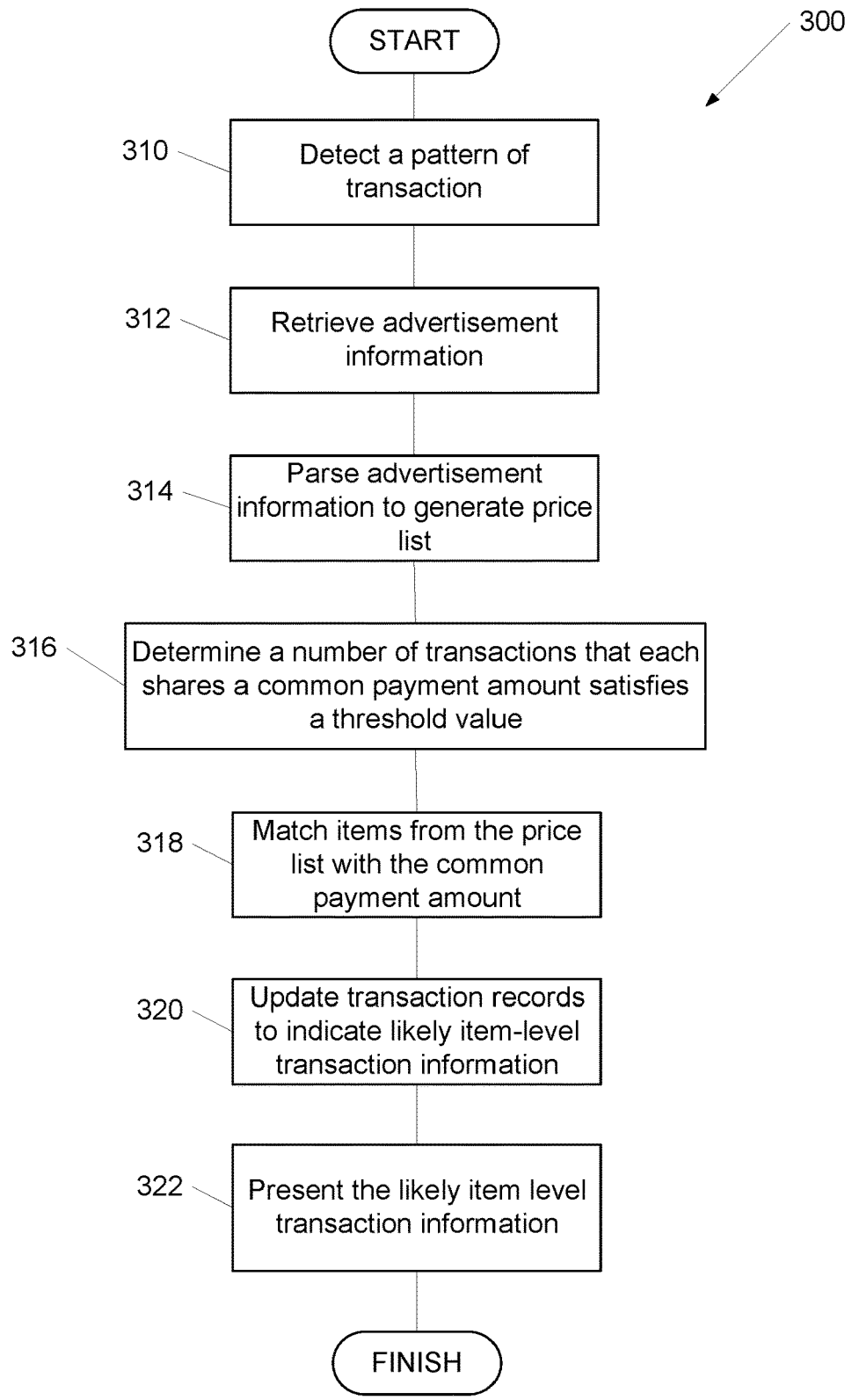
FIG. 3 shows a flow chart of a process for predicting item level transaction information based on the merchant advertisement according to one or more aspects of the disclosure.

Item level data prediction systems may generate item level data based on merchant advertisements, particularly in situations where multiple transactions share a common payment amount. An item level data prediction system may make such predictions based on public accessible advertisement information without requiring any further proprietary information from the merchants. In addition, the customers may not need to provide any additional information either except that they may make regular transactions with the merchants. The common payment amount may indicate that many users have purchased similar items promoted by a merchant in a geographic area. As such, the common payment amount may indicate meaningful transaction level information that may be used to infer item level data corresponding to these transactions. FIG. 3 shows a flow chart of a process for predicting item level data using merchant advertisement according to one or more aspects of the disclosure. Some or all of the steps of process 300 may be performed using one or more computing devices as described herein.

At step 310, a transaction pattern may be determined. In the event that the item level data prediction system detects many customers are spending the same amount at a merchant in a geographic area, it is likely that these customers may have purchased the same item or same groups of items at this merchant. A merchant in a geographic area, such as a Target store in Washington D.C. may run a promotion during Black Friday that all game consoles are advertised as $299. The advertisement may attract potential buyers who are interested in the game consoles to this Target store in D.C. The merchant (e.g. Target store in D.C.) may generate many transactions corresponding to the game consoles and the merchant may send numerous authentication requests to a financial institution such as a credit card company to approve these transactions. In response, the financial institution may detect a surge of transactions that each has a charge of $318 from the Target store in D.C. area. The financial institution may be aware that this transaction amount is meaningful given that the sales tax rate in D.C. is 6%. The item level data prediction system may recognize that a total transaction amount of $318 corresponds to a basic transaction amount of $299 plus a tax amount. The item level data prediction system may detect that many customers have spent $299 to purchase certain products in this Target store in D.C. area. The price of 299 may be recognized as a common payment amount among these customers. Because the financial institution may receive the transaction information as soon as the purchases are made, the item level data prediction may detect the transaction pattern in real time.

At step 312, advertisement information may be retrieved. The advertisement information may be collected by the advertisement collection system via publicly accessible resources and the prediction server systems may retrieve the advertisement information from the advertisement collection systems. In a variety of embodiments, the advertisement information may include an online advertisement from a website of the merchant. The item level prediction systems may use web scraping and other web automation to interact with a merchant's website, enter a zip code corresponding to the geographic area, and retrieve the relevant advertisement information. The advertisement information may include advertisement flyers distributed by the merchant advertising certain products, and the flyers may be scanned and stored as documents in PDF or other formats. The advertisement flyers may also be available online. The advertisement information may be associated with a merchant in a geographic area, such as a zip code. The advertisement information may be associated with a certain period of time, such as a campaign period. For example, a Target store may advertise products for sale during Black Friday or a Starbucks store may run a special three hour promotion on a soy latte.

At step 314, the advertisement information may be parsed. The advertisement information may be parsed by the prediction server systems. The advertisement may also be parsed by the advertisement collection system. In a variety of embodiments, the item level data prediction system may parse the advertisement information using various technologies. For example, an advertisement may state "all video game consoles are $299" on a merchant's website or a flyer. The advertisement information may be parsed using NLP to process the language of the advertisement and extract the relevant information such as the names of the advertised products ("all video game consoles") and the corresponding prices ("$299").

The advertisement information may be parsed using image recognition. For example, the item level data prediction system may recognize an image of a game console such as an XBOX One and a dollar sign associated with the image indicating its price is $299. The advertisement information may be parsed using OCR. For example, the item level data prediction system may convert advertisement information in a scanned document, a photo of a document, or printed text into machine-encoded text, which may be recognized by the item level data prediction system. The item level data prediction system may extract the relevant information to generate a price list including the names of the advertised products and the corresponding prices.

The advertisement information may be parsed using a template logic model. For example, the item level data prediction system may recognize an image of a game console, recognize it as an XBOX One and a number that is closest to the image indicating a price of the XBOX One. With the relevant information extracted from the advertisement information, the item level data prediction system may generate a price list that includes the advertised products, such as an XBOX One, a Playstation 4 (PS4) and a Nintendo Switch, each may be associated with a price tag of $299.

At step 316, a number of transactions that share the common payment amount may be determined. The item level data prediction system may determine that a number of such transactions satisfies a threshold value. In the example of a common payment amount of $318, the item level data prediction system may determine how many transactions that each has spent the common payment amount of $318. In a variety of embodiments, to filter out transactions that are not meaningful, the item level data prediction system may set a threshold value such as 100 transactions, indicating that a large number of customers have purchased certain items or products promoted by the advertisement. The item level data prediction system may trigger further action to analyze the transaction data when the number of transactions following a certain pattern has reached the threshold value. For example, the item level data prediction system may not collect the advertisement information from a merchant and parse the advertisement information until the transaction pattern is triggered and the number of relevant transactions has reached a threshold value. This mechanism may avoid wasting computing resources to prematurely collect advertisement information from a merchant, before a transaction pattern is detected.

In addition to the threshold value for the number of transactions, item level data prediction system may also set a threshold amount with respect to the common payment amount. For example, the item level data prediction system may ignore transactions with a common payment amount that is less than $10 in a Target store, and only consider patterned transactions above this threshold amount. The item level data prediction system may prune trivial transactions that may correspond to a large combination of inexpensive products. For purchases made in a Target store, the customers may be less interested in knowing the details on trivial transactions, which may offer less insights into customers' spending habits. On the other hand, tracking and analyzing the trivial transactions may be computationally expensive and resource draining. In the example of a Starbucks store, the item level data prediction system may not set a threshold amount and the item level data prediction system may prefer to track all the transactions in the coffee shop regardless of the transaction amount. Once the item level data prediction system determines that number of the meaningful patterned transactions has reached a threshold value, the process may proceed to step 318.

At step 318, after determining the threshold values is satisfied, items from the price list may be matched with the common payment amount. In a variety of embodiments, the item level data prediction system may cache a price list generated from step 312. Alternatively, because the item level data prediction system may determine that the threshold is satisfied immediately after the transactions occur, the item level data prediction system may retrieve and parse the advertisement information in real time to generate the price list using the most current advertisement information. In this example, the advertisement information may be collected and parsed after the transaction pattern is detected, which may avoid wasting computing resource compared to the pre-cached approach.

In a variety of embodiments, the item level data prediction system may use an algorithm of least items in the transaction to match the items from the price list to the common payment amount. For example, to satisfy the common payment amount of $299, the customer may have purchased 299 rolls of tapes. Alternatively, the customer may have purchased an XBOX One game console for $299. The item level data prediction system may choose the XBOX One to satisfy the transaction amount of $299, given that a customer is more likely to purchase a game console than 299 rolls of tapes. The item level data prediction system may use a most expensive items possible algorithm. For example, to satisfy the common payment amount of $299, the item level data prediction system may identify either an XBOX One or two Lego sets, with each set priced at $149.50, from the price list. In the example of most expensive items possible algorithm, the item level data prediction system may pick the XBOX One, rather than the two Lego sets to satisfy the payment amount of $299.

In a variety of embodiments, the item level data prediction system may identify a single item or a series of items that may be possible to match the total transaction amount. For example, the item level data prediction system may identify either the XBOX One or two Lego sets that satisfies the payment amount of $299. In another example, if there are several types of game consoles on sale, and each has a price tag of $299, the item level data prediction system may identify each type of game console, such as an XBOX One, a PS4, or a Nintendo Switch as the likely items from the price list to match the transaction amount. In the event that a customer has entered a search term for XBOX One to query the purchase history, the item level data prediction system may automatically identify the XBOX One as the likely item to match the transaction amount.

At step 320, the transaction records may be updated to indicate likely item level transaction information. The item level data prediction system may update the transaction record for a customer after the likely items have been identified. In a variety of embodiments, once a transaction pattern has been detected, and the likely items matching the common payment amount have been identified, the item level data prediction system may update all new transactions record with the item level data as these new transactions occur in real time. The item level data prediction system may update the transaction records retroactively to the transactions that have occurred previously, as long as they share the common payment amount within a certain period of time. The item level data prediction system may also update the transaction record only when the customer has initiated an online banking session with the financial institution. For example, the customer may connect via a user device to query the transaction history of a credit card. The item level data prediction system may also update the transaction records for the customers automatically without any user interaction.

At step 322, the likely item level transaction information associated with a transaction may be presented to a user. Having the item level data available may be beneficial both for the customers and for the financial institutions. Based on the item level transaction information, the user may have the ability to conduct more personalized searches or be presented with more personalized advertisements. For example, a customer may search the transaction history of a credit card account to find out when a Nintendo Switch was purchased and there may be a one year manufacturer warranty on the product. The item level data prediction system may be able to provide the item level data based on a transaction amount and offer more insights into the customer's transaction history. The item level data prediction system may be able to match the likely items to the common payment amount without requesting further information either from the merchants or from the customers. A variety of techniques for matching the likely items are described with respect to FIG. 4.

Matching Items with Common Payment Amount

Figure 4:
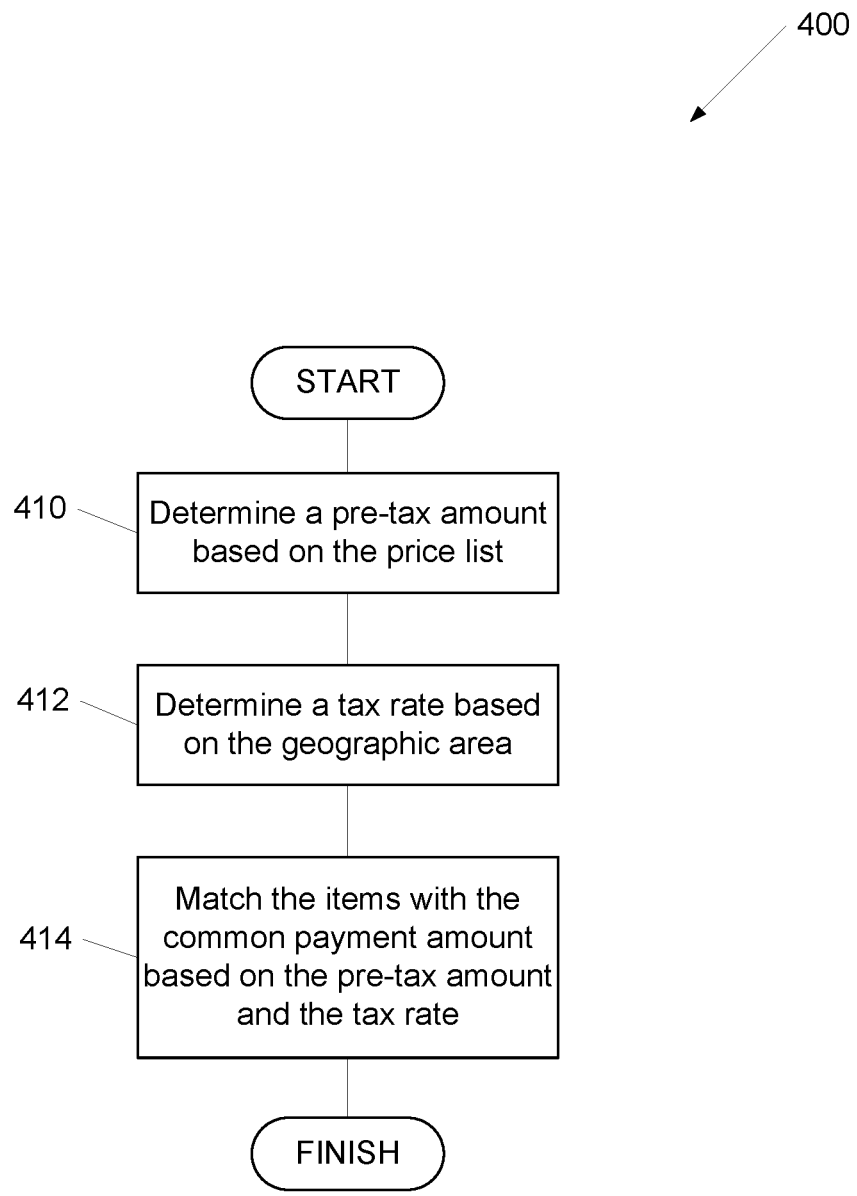
FIG. 4 shows a flow chart of a process for matching items with a common payment amount according to one or more aspects of the disclosure.

The item level data prediction system may consider tax information in attempting to match the items from the price list with the common payment amount. The tax rate corresponding to the geographic area where a merchant is located may offer further insights into the transaction details. FIG. 4 shows a flow chart of a process for matching the items with the common payment amount according to one or more aspects of the disclosure. Some or all of the steps of process 400 may be performed using one or more computing devices as described herein.

At step 410, a pre-tax amount for the items may be determined based on the price list. The price list may include a list of advertised products and the corresponding prices, which are the pre-tax amount. The items listed on the price list may be a subset of all products that are available for sale from a merchant, because the price list may only include promoted products that are on sale for a period of time, such as a campaign period of the advertisements. In the event that a transaction pattern triggers the item level data prediction system to collect and parse the advertisement information, the items listed on the price list may be further filtered with the items that are currently on sale according to the advertisements.

At step 412, a tax rate for the items may be determined based on the geographic area. The item level data prediction system may include a tax database which stores information such as the zip codes corresponding to the geographic areas of the merchants, the city and state tax rates corresponding to the zip codes, and the various tax rates based on the types of the products. For example, the item level data prediction system may determine that a merchant with a zip code 20005 is located in metro Washington D.C. area and the city tax rate is 6%. The tax rate may change for different types of items. For instance, a location may have a city tax rate of 5%, a state tax rate of 1%, but not apply the city tax rate of clothing. In a variety of embodiments, the item level data prediction system may exclude the items on the price list whose prices are above the common payment amount. The item level data prediction system may determine the tax amount for the items on the price list whose prices are less than the common payment amount and calculate the tax amount based on the tax rate.

At step 414, the items may be matched with the common payment amount based on the pre-tax amount and the tax rate. Due to the variations in the tax rates of various merchants and their products, if there is an exact match between the items from the price list and the common payment amount, it may be likely that the customers have purchased these items. The tax information may serve as a verification step to facilitate the matching process. The matching result may be further verified by user interactions as described herein.

Generating Item Level Data Based on User Interactions

Figure 5:
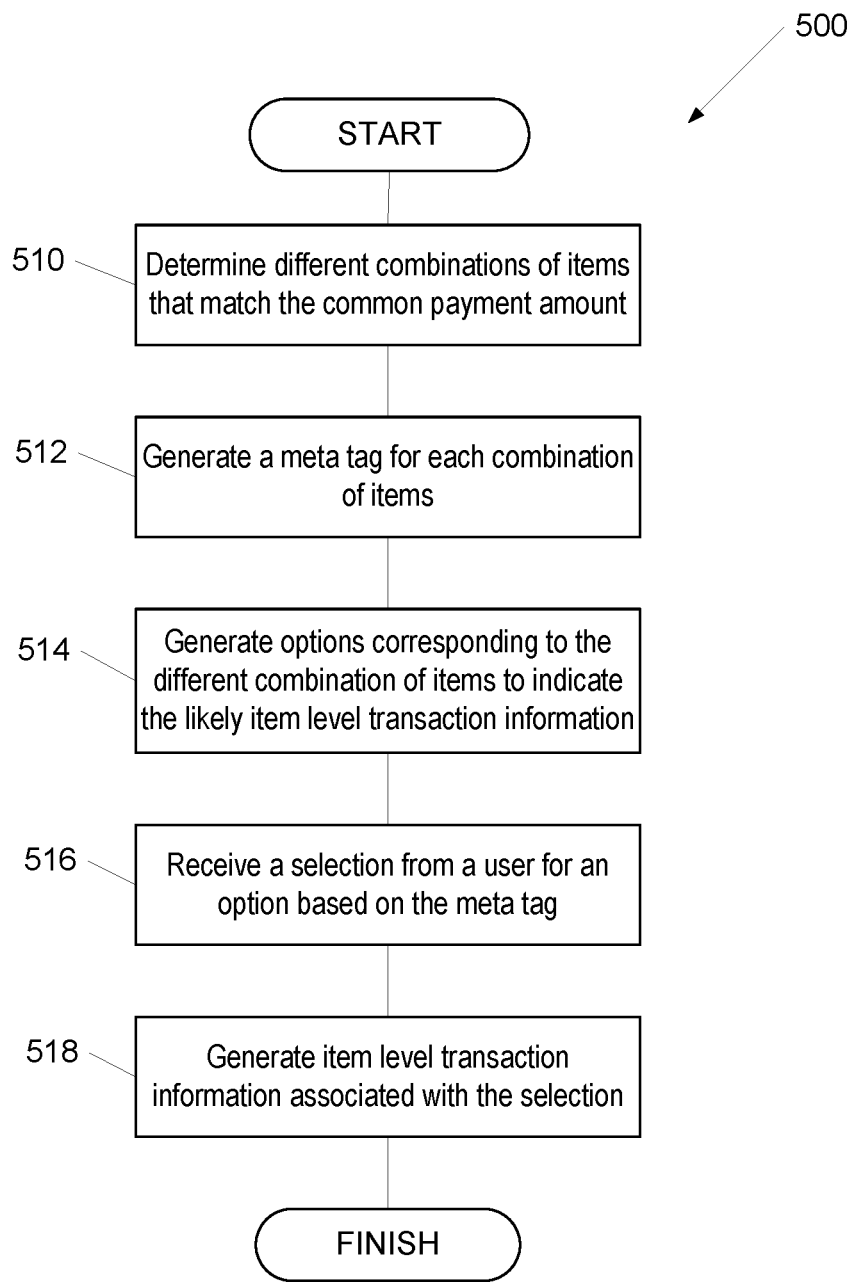
FIG. 5 shows a flow chart of a process for generating item level transaction information based on user interactions according to one or more aspects of the disclosure.

FIG. 5 shows a flow chart of a process for generating item level data based on user interactions according to one or more aspects of the disclosure. Some or all of the steps of process 500 may be performed using one or more computing devices as described herein.

At step 510, different combinations of items that match the common payment amount may be determined. The item level data prediction system may identify a variety of items from the price list that match the common payment amount. For example, an advertisement from a Target store states that "all video game consoles are on sale for $299." For a common payment amount of $318, there may be three items—an XBOX One, a PS4 or a Nintendo Switch—that match the pre-tax transaction amount of $299. The item level data prediction system may identify all three combinations of items.

In another example, the advertisement from the Target store states that "all video game consoles are on sale for $299, and all video games are $9.99." For a common payment amount of $524, the item level data prediction system may determine that this transaction amount may correspond to the price of a game console and 10 video games. As such, there may be three items—an XBOX One, a PS4 or a Nintendo Switch—that match the pre-tax transaction amount of $299. There may be ten video games to be included in the transactions, although the exact names of the video games remain unknown. The item level data prediction system may identify the combination of the video console and ten unknown video games.

At step 512, a meta tag may be generated for the items in each combination. The item level data prediction system may generate a meta tag "video game console" for the XBOX One, the PS4 or the Nintendo Switch in the combinations of items that match the common payment amount. The item level data prediction system may generate a meta tag "video game" for the ten unknown video games from the price list. In the example that two Lego sets match the price of $299, the item level data prediction system may generate a meta tag "Lego set" for each Lego set.

At step 514, options may be generated corresponding to the combinations of the items. Each combination of items that match the common payment amount may be presented as different options. For example, a first option may be a XBOX One, a second option may be a PS4, and a third option may be a Nintendo Switch. Each option may have a generic meta tag "video game console." Each option may have a specific meta tag that corresponds to a XBOX One, a PS4, and a Nintendo Switch, respectively. Another option may be two Lego sets each labelled as "Lego set."

At step 516, a selection may be received from a user. Based on the meta tag, the user may make a selection to indicate what was actually purchased. For example, when the system identifies a transaction amount of $318 and presents two options to the user: an item with a meta tag of a "video game console" or two items with a meta tag of "Lego set." Based on the meta tag, the user may make the selection corresponding to her previous purchase.

At step 518, item level transaction information may be generated associated with the selection. For example, the user may make a selection of a video game console, the item level transaction information may be generated for the three types of game consoles. In a variety of embodiments, the item level data prediction system may ask the user to make further selections based on the specific meta tag of an XBOX One, a PS4, and a Nintendo Switch. The item level data prediction system may generate more specific item level transaction information based on the selection. The item level data prediction system may also generate the item level transaction information without further interaction from the user. For example, a user may have previously searched the purchase history for an XBOX One, the item level data prediction system may infer that the best match is the XBOX One in lieu of the PS4 and generate item level transaction information automatically without further user inputs.

Parsing Advertisement Information

Figure 6:
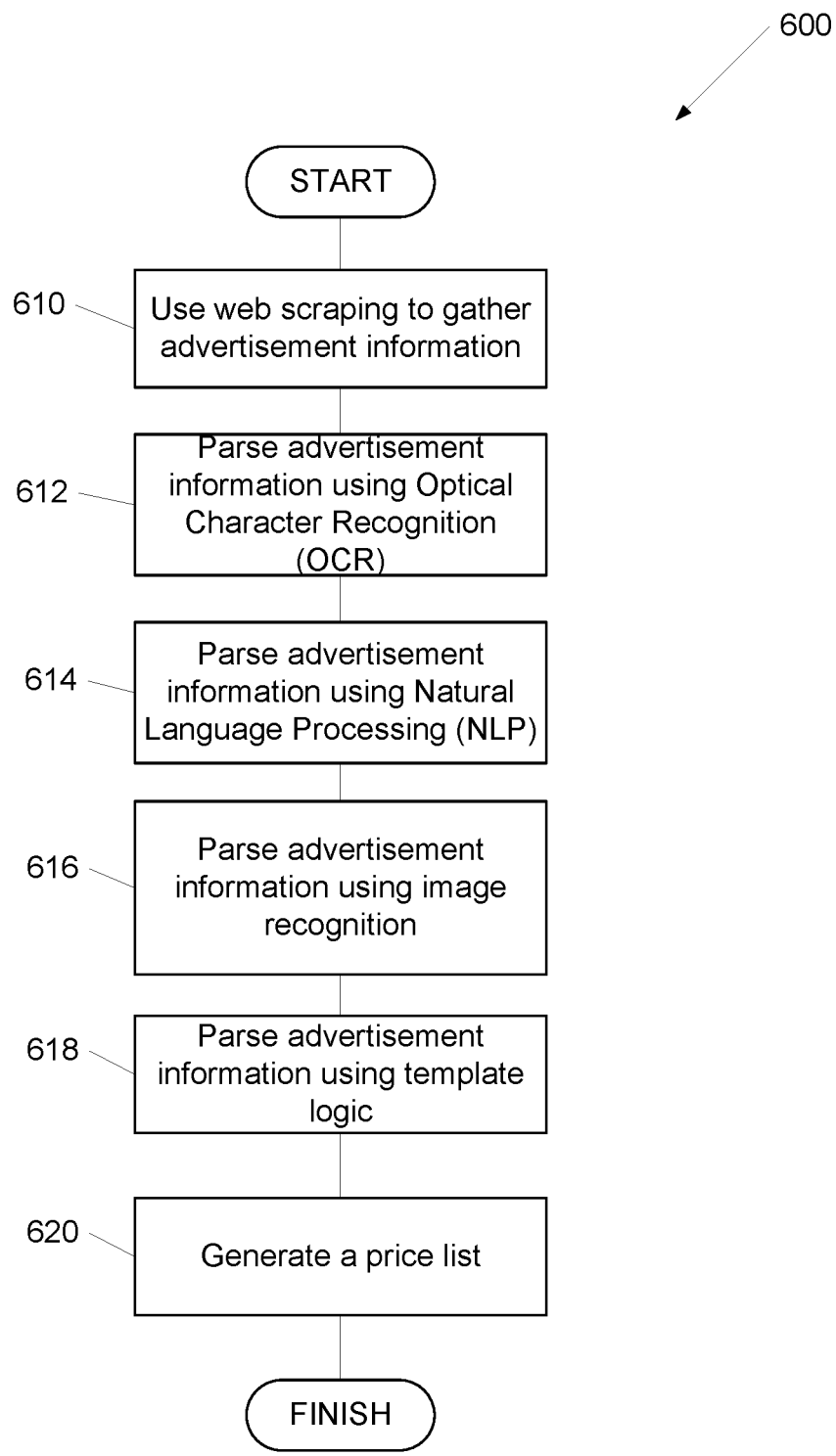
FIG. 6 shows a flow chart of a process for parsing the advertisement information according to one or more aspects of the disclosure.

The item level data prediction system may use a machine learning algorithm to parse the advertisement information, as discussed above with respect to FIG. 3. FIG. 6 shows a flow chart of a process for parsing the advertisement information with further details according to one or more aspects of the disclosure. Some or all of the steps of process 600 may be performed using one or more computing devices as described herein.

At step 610, advertisement information may be gathered. The item level data prediction system may use a machine learning algorithm to automatically gather the advertisement information. The item level data prediction system may use web scraping to extract advertisement information from the web sites of the merchants. For example, the item level data prediction system may use scripts to specify there are five steps to pull the advertisement information from the web site of a Target store. The item level data prediction system may use machine learning to recognize the different elements on the web site to click on in order to extract the advertisement information or these elements may be programmatically set.

At step 612, advertisement information may be parsed using OCR. Given an image representing printed text, the item level data prediction system may determine the corresponding text in the image. For example, the item level data prediction system may convert advertisement information in a scanned document, a photo of a document, or printed text into machine-encoded text, which may be recognized by the item level data prediction system. The item level data prediction system may extract the relevant information to generate a list of the names of the advertised products and the corresponding prices.

At step 614, advertisement information may be parsed using NLP to process the advertisement information, generate rules and identify the intended semantics. For example, the advertisement information may be parsed using NLP to process the language of the advertisement and extract the relevant information such as the names of the advertised products ("all video game consoles") and the corresponding prices ("$299"). For an advertisement stating that "$9.99 for any of the following games," the item level data prediction system may associate the price $9.99 with all 20 pictures below the statement. The item level data prediction system may also layer the NLP approach over the template logic algorithm, as discussed in detail with respect to step 618.

At step 616, advertisement information may be parsed using image recognition. The item level data prediction system may use image recognition to identify what is in the pictures. Generally, computer programs may have difficulties recognizing the picture when the picture is taken from a strange angle, or has undisguisable background. However, the item level data prediction system may recognize the images of the advertisements with high confidence, because these advertisements were generated by computer programs online and extracted from the merchant web sites. The item level data prediction system may recognize the images, and translate them to obtain the product names, descriptions and prices.

At step 618, advertisement information may be parsed using a template logic algorithm. The numbers and letters may appear on an advertisement in random places, without indicating their relations to the items in the advertisement. The item level data prediction system may use template logic algorithm to recognize the locations of the numbers and letters, and their relations to each other. The item level data prediction system may also recognize the relations of the numbers and letters to the pictures of the items in the advertisement. The item level data prediction system may then use image recognition to identify where and what the pictures are. The item level data prediction system may subsequently recognize where the number and letters are in relation to the images based on spatial proximity. If an image is in proximity with the number 299, the item level data prediction system may associate the image with the number, indicating the price of the item in the image is $299. Steps 612 to 618 may be optional, and the item level data prediction system may perform any combination of these steps to parse the advertisement information.

At step 620, a price list may be generated based on the parsed information. The item level data prediction system may generate the price list including the names of the items, and the corresponding price for each item. The advertisements may specify a campaign period when the promotion or sale is valid. The advertisements and the validation time may be cached by the item level data prediction system. In the event that the item level data prediction system prefers not to parse the advertisements to generate the price list every time it detects that a transaction amount matches a common payment amount, the price list may be cached. The item level data prediction system may parse out the advertisement and cache the price list for the period of time that the advertisement is valid.

In some examples, the item level data prediction system may keep the price list in the cache until the merchant store's closing time for the day, or the price list may be cached for 2-3 days depending on the duration of the campaign period of the advertisement. In other examples, the machine learning algorithm may recognize that a threshold of 150 customers spending $318 has been reached. At that time, the item level data prediction system may run the machine learning algorithm to get the advertisement information, parse the advertisement and generate the price list. Once the threshold is reached, the item level data prediction system may retroactively apply the item level data to all transactions that the machine learning algorithm has recognized having the transaction pattern. In still other examples, item level data prediction system may proactively apply the item level data as the new transactions arrive in the item level data prediction system in real time.

The item level data prediction system may recognize a transaction pattern associated with a first common payment amount. The item level data prediction system may cache the transaction pattern. When the item level data prediction system recognizes a new transaction pattern associated with a second common payment amount, it may reset the machine learning algorithm to cache the new transaction pattern. The item level data prediction system may reset the machine learning algorithm to a new transaction pattern after the campaign period associated with the previous transaction pattern has expired.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
providing, as input to a first machine learning model, transaction data comprising transactions during a first time period, wherein the first machine learning model is trained using labeled transaction data associated with historical transactions conducted at different geographic areas and at different time periods;
determining, using the first machine learning model and based on the transaction data, a transaction pattern indicating a common payment amount in a plurality of transactions associated with a merchant during the first time period;
determining, using a second machine learning model, a plurality of elements associated with a website for the merchant displaying price information for advertised products;
parsing, based on the plurality of elements, the price information to generate a price list for the advertised products;
determining, based on the price list, a plurality of combinations of advertised products that match the common payment amount, wherein each of the plurality of combinations indicates item-level transaction information corresponding to the common payment amount;
causing display, on a user device, of the plurality of combinations of advertised products;
receiving, from the user device, a selection of a first combination of advertised products; and
updating, based on the selection, the item-level transaction information associated with the first combination of advertised products.

2. The computer-implemented method of claim 1, further comprising:
generating a generic meta tag for the plurality of combinations of advertised products that match the common payment amount.

3. The computer-implemented method of claim 2, wherein determining the plurality of combinations of advertised products that match the common payment amount is based on the generic meta tag.

4. The computer-implemented method of claim 1, wherein determining the plurality of combinations comprises:
   matching the advertised products on the price list with the common payment amount using a least items algorithm.

5. The computer-implemented method of claim 1, further comprising:
   generating a specific meta tag for the each of the plurality of combinations of advertised products that matches the common payment amount.

6. The computer-implemented method of claim 1, wherein receiving the selection comprises:
   receiving the selection of the first combination of advertised products corresponding to a specific meta tag for a specific combination of the advertised products that matches the common payment amount.

7. The computer-implemented method of claim 1, wherein determining the transaction pattern comprises:
   determining that a quantity of the plurality of transactions sharing the common payment amount satisfies a threshold value.

8. The computer-implemented method of claim 1, further comprising:
   parsing the price information using natural language processing (NLP).

9. The computer-implemented method of claim 1, further comprising:
   parsing the price information using a template.

10. The computer-implemented method of claim 1, further comprising:
    parsing the price information using image recognition.

11. The computer-implemented method of claim 1, wherein determining the plurality of combinations comprises:
    determining a pre-tax amount for each advertised product on the price list;
    retrieving, from a geographic tax database, a tax rate for the each advertised product based on a geographic area associated with the merchant; and
    matching each combination of advertised products with the common payment amount based on the pre-tax amount and the tax rate.

12. A computing device comprising:
    one or more processors; and
    memory storing instructions that, when executed by the one or more processors, cause the computing device to:
       provide, as input to a first machine learning model, transaction data comprising transactions conducted during a first time period, wherein the first machine learning model is trained using labeled transaction data associated with historical transactions conducted at different geographic areas and at different time periods;
       determine, using the first machine learning model and based the transaction data, a transaction pattern indicating a common payment amount in a plurality of transactions associated with a merchant during the first time period;
       determining, using a second machine learning model, a plurality of elements associated with a website for the merchant displaying price information for advertised products;
       parsing, based on the plurality of elements, the price information to generate a price list for the advertised products;
       determine, based on the price list, a plurality of combinations of advertised products that match the common payment amount, wherein each of the plurality of combinations indicates item-level transaction information corresponding to the common payment amount;
       cause display, on a user device, of the plurality of combinations of advertised products;
       receive, from the user device, a selection of a first combination of advertised products; and
       update, based on the selection, the item-level transaction information associated with the first combination of advertised product.

13. The computing device of claim 12, wherein the instructions cause the computing device to:
    generate a generic meta tag for the plurality of combinations that match the common payment amount.

14. The computing device of claim 12, wherein the instructions cause the computing device to:
    generate a specific meta tag for the each of the plurality of combinations that matches the common payment amount.

15. The computing device of claim 12, wherein the instructions cause the computing device to:
    receive the selection of the first combination of advertised products corresponding to a specific meta tag for a specific combination of the advertised products that matches the common payment amount.

16. The computing device of claim 12, wherein the instructions cause the computing device to:
    determining the transaction pattern by determining that a quantity of the plurality of transactions sharing the common payment amount satisfies a threshold value.

17. The computing device of claim 12, wherein the instructions cause the computing device to:
    determine a pre-tax amount for each advertised product on the price list;
    retrieve, from a geographic tax database, a tax rate for each advertised product based on a geographic area associated with the merchant; and
    match each combination of advertised products with the common payment amount based on the pre-tax amount and the tax rate.

18. One or more non-transitory media storing instructions that, when executed by one or more processors, cause the one or more processors to perform steps comprising:
    providing, as input to a first machine learning model, transaction data comprising transactions conducted during a first time period, wherein the first machine learning model is trained using labeled transaction data associated with historical transactions conducted at different geographic areas and at different time periods;
    determining, using the first machine learning model and based the transaction data, a transaction pattern indicating a common payment amount in a plurality of transactions associated with a merchant during the first time period;
    determining, using a second machine learning model, a plurality of elements associated with a website for the merchant displaying price information for advertised products;
    parsing, based on the plurality of elements, the price information to generate a price list for the advertised products;
    determining, based on the price list, a plurality of combinations of advertised products that match the common payment amount, wherein each of the plurality of combinations indicates item-level transaction information corresponding to the common payment amount;

causing display, on a user device, of the plurality of combinations of advertised products;

receiving, from the user device, a selection of a first combination of advertised products; and updating, based on the selection, the item-level transaction information associated with the first combination of advertised product.

19. The non-transitory medium of claim 18, wherein the instructions, when executed by the one or more processors, cause the one or more processors to perform steps comprising:

generating a generic meta tag for the plurality of combinations of the advertised products that match the common payment amount.

20. The non-transitory medium of claim 18, wherein the instructions, when executed by the one or more processors, cause the one or more processors to perform steps comprising:

determining the transaction pattern by determining that a quantity of the plurality of transactions sharing the common payment amount satisfies a threshold value.

* * * * *